(12) United States Patent
Nam

(10) Patent No.: US 7,545,465 B2
(45) Date of Patent: Jun. 9, 2009

(54) TRANSFLECTIVE LIQUID CRYSTAL DISPLAY DEVICE AND FABRICATING METHOD THEREOF

(75) Inventor: Chul Nam, Gangneung-si (KR)

(73) Assignee: LG. Display Co., Ltd., Seoul (KR)

( * ) Notice: Subject to any disclaimer, the term of this patent is extended or adjusted under 35 U.S.C. 154(b) by 51 days.

(21) Appl. No.: 11/025,219

(22) Filed: Dec. 28, 2004

(65) Prior Publication Data

US 2005/0140879 A1    Jun. 30, 2005

(30) Foreign Application Priority Data

Dec. 29, 2003  (KR)  ............ 10-2003-0099358

(51) Int. Cl.
*G02F 1/1335* (2006.01)
(52) U.S. Cl. .................. 349/114; 349/113
(58) Field of Classification Search .......... 349/113, 349/114
See application file for complete search history.

(56) References Cited

U.S. PATENT DOCUMENTS

| | | | |
|---|---|---|---|
| 6,124,971 A | 9/2000 | Ouderkirk et al. | |
| 6,262,842 B1 | 7/2001 | Ouderkirk et al. | |
| 6,285,426 B1 * | 9/2001 | Akins et al. | 349/114 |
| 6,538,711 B2 * | 3/2003 | Funahata et al. | 349/113 |
| 6,750,932 B2 * | 6/2004 | Kim | 349/114 |
| 6,924,858 B2 * | 8/2005 | Nagayama et al. | 349/113 |
| 2003/0038907 A1 * | 2/2003 | Ikeno et al. | 349/113 |
| 2003/0090607 A1 | 5/2003 | Kamijo | |
| 2004/0021810 A1 * | 2/2004 | Kawaguri et al. | 349/113 |
| 2004/0056997 A1 * | 3/2004 | Yoshii et al. | 349/113 |

FOREIGN PATENT DOCUMENTS

| | | |
|---|---|---|
| CN | 1414416 | 4/2006 |
| WO | WO 03/052724 | 6/2006 |

* cited by examiner

*Primary Examiner*—David Nelms
*Assistant Examiner*—Nathanael R Briggs
(74) *Attorney, Agent, or Firm*—Brinks Hofer Gilson & Lione

(57) ABSTRACT

A transflective liquid crystal display device includes opposing substrates having a liquid crystal layer interposed between the substrates. Polarizers are disposed on outer sides of the substrates. An uneven transflective film is disposed on one of the polarizers. A backlight unit is disposed outside of the uneven transflective film. The uneven transflective film includes a base film, convex patterns on the base film and a reflective layer in concave portions between the convex patterns. A passivation layer is disposed on the convex patterns and the reflective layer. Light from the backlight unit is transmitted through the convex patterns and ambient light is reflected by the reflective layer in the concave portions.

6 Claims, 8 Drawing Sheets

US 7,545,465 B2

TRANSFLECTIVE LIQUID CRYSTAL DISPLAY DEVICE AND FABRICATING METHOD THEREOF

This application claims the benefit of the Korean Patent Application No. 2003-99358, filed in Korea on Dec. 29, 2003, which is hereby incorporated by reference for all purposes as it fully set forth herein.

BACKGROUND

1. Field

The present invention relates to a liquid crystal display device, and more particularly, to a transflective liquid crystal display device having high utilization efficiency for light and a fabricating method thereof.

2. Discussion of the Related Art

Generally, transflective liquid crystal display (LCD) devices function as both transmissive and reflective LCD devices. Because transflective LCD devices can use both a backlight and natural or artificial ambient light, the transflective LCD devices may be used in more circumstances, and power consumption of transflective LCD devices may be reduced.

FIG. 1 is an exploded perspective view of an LCD device according to the related art. As shown in FIG. 1, a liquid crystal display (LCD) device 10 has an upper substrate 12 having a black matrix 17, a color filter layer 16 including sub-color filters and a common electrode 13 on the color filter layer 16, and a lower substrate 14 having a thin film transistor (TFT) T and a pixel electrode 20 connected to the TFT T. A liquid crystal layer 18 is interposed between the common electrode 13 and the pixel electrode 20. The lower substrate 14 is referred to as an array substrate because array lines including a gate line 25 and a data line 27 are formed thereon. The gate line 25 and the data line 27 cross each other forming a matrix, and the TFT T is connected to the gate line 25 and the data line 27. The gate line 25 and the data line 27 define a pixel region P by crossing each other, and the TFT T is formed near a crossing portion of the gate line 25 and the data line 27. The pixel electrode 20 is formed of a transparent conductive material such as indium-tin-oxide (ITO) and indium-zinc-oxide (IZO) in the pixel region P. The upper substrate 12 is referred to as a color filter substrate because the color filter layer 16 is formed thereon.

A reflective layer 21 of a reflective material such as aluminum (Al) or Al alloy is formed in the pixel region P. However, when the reflective layer 21 is connected to the pixel electrode 20, the reflective layer 21 can act as an electrode. The reflective layer 21 has a transmittance hole H so that the pixel region P is divided into a reflective portion RP and a transmissive portion TP. The transmissive portion TP corresponds to the transmissive hole H and the reflective portion RP corresponds to the other portions of the reflective layer 21.

However, because the transflective LCD device is manufactured to selectively use a reflective mode or a transmissive mode, utilization efficiency for light is relatively low. Particularly, when the transflective LCD device is used as the reflective mode, it depends on natural light. Therefore, the utilization efficiency is low in comparison with the transmissive mode. As a result, interchanging the reflective mode with the transmissive mode causes a brightness difference.

To solve these problems, an uneven reflective layer is formed on the reflective portion to induce an irregular reflection by minimizing incident light specularly-reflected from outside and to improve the entire brightness of the reflective mode and transmissive mode according to the related art.

Hereinafter, the transflective LCD device having the uneven reflective layer according to the related art will be explained referring to FIG. 2.

FIG. 2 is a schematic plan view showing one pixel region for a transflective LCD device having an uneven reflective layer according to the related art.

In FIG. 2, a gate line 34 is formed on a substrate 30 along a first direction, and a data line 46 crosses the gate line 34 to define a pixel region P.

A thin film transistor T is formed near a crossing of the gate line 34 and the data line 46. A gate electrode 32, a semiconductor layer 41, source and drain electrodes 42 and 44 constitute the thin film transistor T.

A pixel electrode 60 of a transparent conductive material is formed in the pixel region P and is connected to the thin film transistor T. A reflective layer 64 having a plurality of unevennesses 52 is formed in the pixel region P and has a transmissive hole 58 that exposes the central portion of the pixel electrode 60.

The pixel region P includes a transmissive portion TP in the transmissive hole 58 and a reflective portion RP in a portion of the reflective layer 21 except a portion of the transmissive hole 58.

That is to say, the pixel electrode 60 acts as a driving electrode of the liquid crystal layer 18 (of FIG. 1) with the common electrode 13 (of FIG. 1). On the other hand, the reflective layer 64 (or reflective electrode) mainly acts as a reflective means. Therefore, the uneven patterns increase reflectance of a surface of the reflective layer.

Next, it will be explained about the fabricating method for the transflective LCD device having the uneven reflective layer according to the related art.

FIGS. 3A to 3G are schematic cross sectional views taken along lines III-III of FIG. 2, which shows a fabricating process for a transflective LCD device according to the related art.

In FIG. 3A, a switching region S, a transmissive portion TP, and a reflective portion RP in periphery of the transmissive portion TP are defined in a substrate 30. The transmissive and reflective portion TP and RP constitute a pixel region P.

A gate electrode 32 is formed on the substrate 30 in the switching region S. For example, the gate electrode 32 is formed as a single layer or a double layer. When the gate electrode 32 is a single layer, it is selected from one of aluminum (Al), Al alloy, tungsten (W), chromium (Cr) and molybdenum (Mo). Meanwhile, when the gate electrode 32 is a double layer, the gate electrode 32 is selected from one of Al/Cr and Al/Mo.

In FIG. 3B, a gate insulating layer 36 is formed of inorganic insulating materials over an entire surface of the substrate 30 having the gate electrode 32, and an active layer 38 and an ohmic contact layer 40 are sequentially formed on the gate insulating layer 36. The active layer 38 and the ohmic contact layer 40 are made of intrinsic amorphous silicon and the doped amorphous silicon, respectively. The active layer 38 and the ohmic contact layer 40 constitute a semiconductor layer 41.

In FIG. 3C, source and drain electrodes 42 and 44 are formed of a metallic material on the semiconductor layer 41, and a passivation layer 46 is formed of an insulating material on an entire surface of the substrate 30 having the source and drain electrodes 42 and 44. At this time, in order to improve contact between the semiconductor layer 41 and the passivation layer 46, the passivation layer 46 is made of an inorganic insulating material including silicon nitride (SiNx) and silicon oxide (SiOx).

In FIG. 3D, a photosensitive layer 50 is formed of a photosensitive material on the passivation layer 46. The photosensitive material is selected from an organic material such as acrylic resin. This step includes forming an uneven pattern of squares (not shown) in a surface portion of the photosensitive layer 50 and forming the first uneven pattern 51 as a hemispherical shape by melting at a predetermined temperature within about 350 degrees Celsius.

Next, an inorganic insulating layer 54 is formed of a transparent inorganic material on an entire surface of the substrate 30 having the first uneven pattern 51 of the hemispherical shape. At this time, the inorganic insulating layer 54 has a second uneven pattern 52 of a hemispherical shape corresponding to the first uneven pattern 51 of the photosensitive layer 50. The first and second uneven patterns 51 and 52 are located in the reflective portion RP.

In FIG. 3E, portions of the passivation layer 46, the photosensitive layer 50 and the inorganic insulating layer 54 that correspond to a portion of the drain electrode 44 and the transmissive portion TP are etched to form a drain contact hole 56 and a transmissive hole 58 that expose the portions of the drain electrode 44 and the transmissive portion TP, respectively. Specifically, a portion of the gate insulating layer 36 in the transmissive hole 58 may be etched due to etching rate differences between a portion of the drain contact hole 56 and a portion of the transmissive hole 58 as shown in FIG. 3E.

In FIG. 3F, a reflective layer 60 is formed of metallic materials having a high reflectance such as aluminum (Al) and silver (Ag) on the substrate 30 having the drain contact hole 56 and the transmissive hole 58. The reflective layer 60 corresponds to the reflective portion RP except portions of the drain contact hole 56 and the transmissive hole 58.

In FIG. 3G, an inorganic insulating layer 62 is formed of an inorganic insulating material on the substrate 30 having the reflective layer 60. At this time, through this step, the inorganic insulating layer 62 has holes corresponding to the drain contact hole 56 and the transmissive hole 58 that can expose the portion of the drain electrode 42 and the transmissive portion TP.

Next, a pixel electrode 64 is formed of transparent conductive materials such as indium tin oxide (ITO) on the inorganic insulating layer 62 and is connected to the drain electrode 44 via the drain contact hole 56.

As explained above, the transflective LCD device according the related art is manufactured.

However, this method of fabricating for the transflective LCD device according to the related art uses a large number of processes and thus the overall process becomes complicated. Therefore, production yield of the transflective LCD device is reduced.

SUMMARY

By way of introduction only, in one aspect, a transflective liquid crystal display device includes: a first substrate; a second substrate facing the first substrate; a liquid crystal layer interposed between the first and second substrates; a first polarizer on an outer side of the first substrate; a second polarizer on an outer side of the second substrate; an uneven transflective film on the first polarizer; and a backlight unit outside of the uneven transflective film.

In another aspect, an uneven transflective film includes: a base film including a plurality of convex patterns and a plurality of concave portions between the plurality of convex patterns; and a reflective layer in the plurality of concave portions. The reflective layer is formed on the concave patterns but not on the convex patterns. Each convex portion is defined from an apex of the curves in the base film (where the slope is zero) to a predetermined distance from the apex (where the slope is a set value). Each concave portion is defined from the predetermined distance from the apex to the point where the curve meets the adjacent curve or the curve otherwise terminates. The area of the convex portion bounded by the predetermined distance defines the open area in which light is transmitted through the film.

In another aspect, a method of fabricating an uneven transflective film includes: forming a plurality of convex patterns on a base film; forming a reflective material layer on an entire surface of the convex patterns; and etching the reflective material layer corresponding to the convex patterns to form a reflective layer between the convex patterns.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

In the drawings.

DETAILED DESCRIPTION OF THE EMBODIMENTS

Reference will now be made in detail to the illustrated embodiments of the present invention, examples of which are illustrated in the accompanying drawings.

Figure 4:
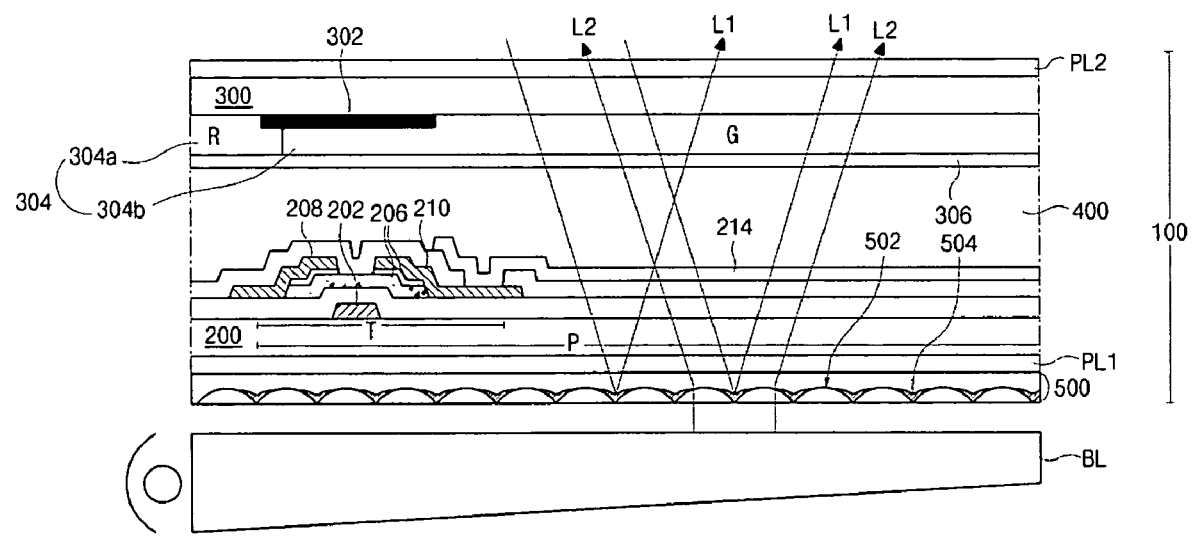
FIG. 4 is a schematic plan view showing one pixel region for a transflective LCD device having the uneven reflective layer according to the present invention.

FIG. 4 is a schematic plan view showing a transflective LCD device having an uneven transflective film according to one embodiment of the present invention.

In FIG. 4, an LCD device 100 includes a first substrate 200, a second substrate 300 facing the first substrate 200, a liquid crystal layer 400 interposed between the first and second substrates 200 and 300, a first polarizer PL1 on an outer side of the first substrate 200, a second polarizer PL2 on an outer side of the second substrate 300.

At this time, a pixel region P is defined in each of the first and second substrates 200 and 300. A gate electrode 202 is formed on the first substrate 200, a semiconductor layer 206 over the gate electrode 202, and source and drain electrodes 208 and 210 on the semiconductor layer 206. The gate electrode 202, the semiconductor layer 206, and the source and drain electrodes 208 and 210 constitute a thin film transistor T. A pixel electrode 214 is formed in the pixel region P of the first substrate 200 and is connected to the thin film transistor T.

A black matrix 302 is formed on the second substrate 300, a color filter layer 304 on the black matrix 302. The color filter layer 304 includes a red sub-color filter 304a, a green sub-color filter 304b and a blue sub-color filter (not shown). Each of the red sub-color filter 304a, the green sub-color filter 304b and the blue sub-color filter (not shown) is located in the pixel region P. A common electrode 306 is formed on an entire surface of the color filter layer 304. In addition, a liquid crystal layer 400 is interposed between the pixel electrode 214 and the common electrode 306.

Although not shown, the black matrix 302 corresponds to a portion of the thin film transistor T and a portion that a gate line and a data line.

In addition, an uneven transflective film 500 is disposed on the first polarizer PL1, and a backlight unit BL is disposed outside of the uneven transflective film 500. At this time, the uneven transflective film 500 includes a plurality of convex patterns 502 having hemispherical shapes that face toward an inner side of the liquid crystal device 100 and a reflective layer 504 between the convex patterns 502.

Although not shown, a portion of the reflective layer 504 corresponds to a reflection region where a first incident light L1 from natural ambient light is reflected, and a portion of the convex patterns 502 corresponds to a transmission region where a second incident light L2 from the backlight unit BL is transmitted.

Figure 3A:
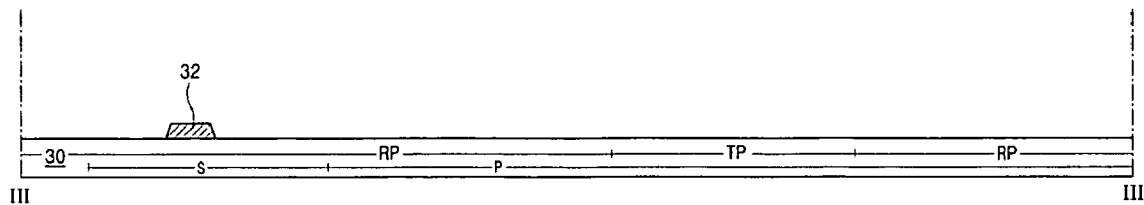
FIGS. 3A to 3G are schematic cross sectional views taken along lines III-III of FIG. 2, which shows a fabricating process for a transflective LCD device according to the related art.
Figure 3B:
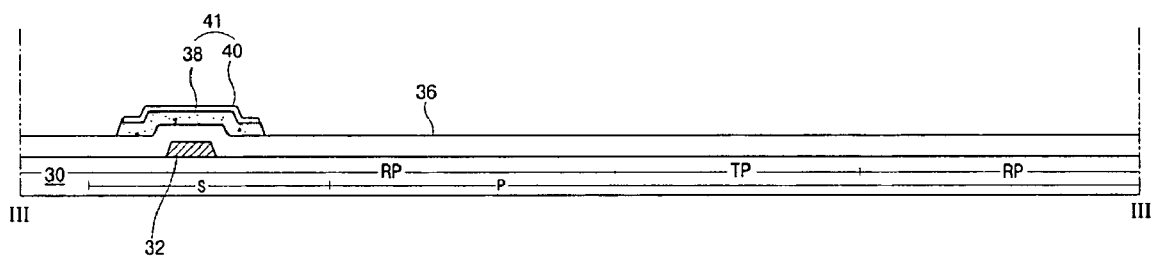
Figure 3C:
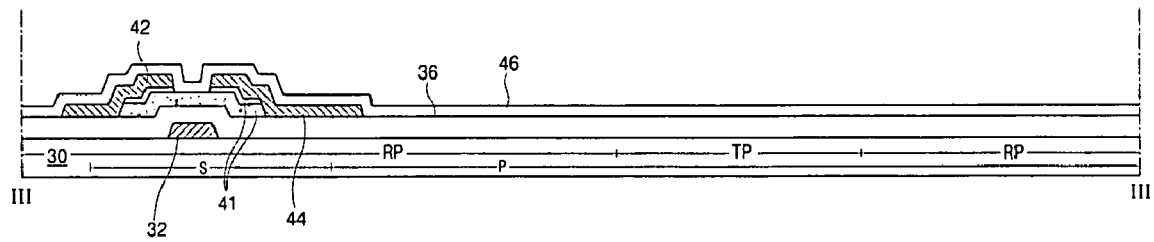
Figure 3D:
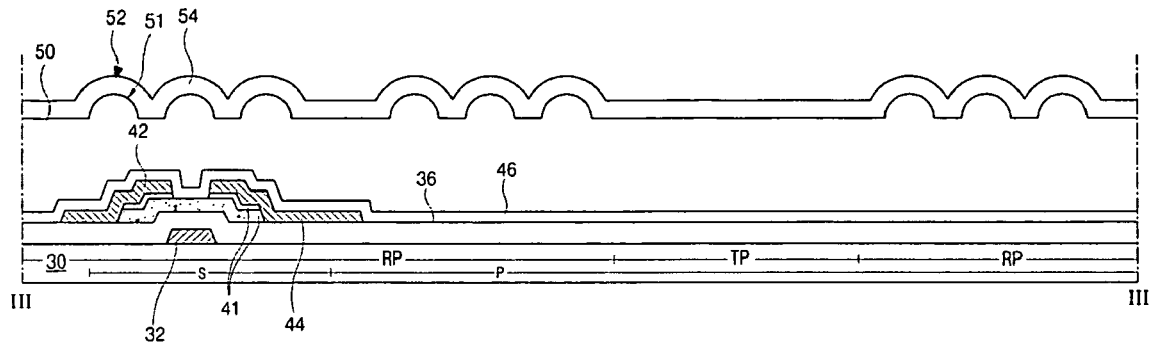
Figure 3E:
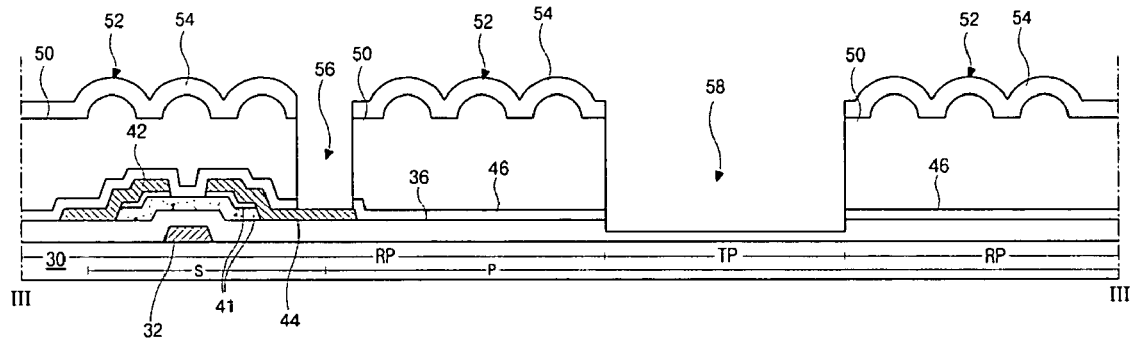
Figure 3F:
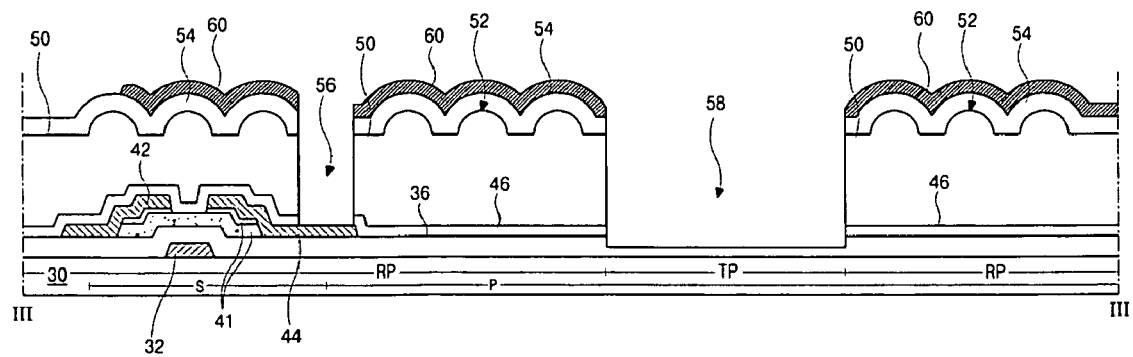
Figure 3G:
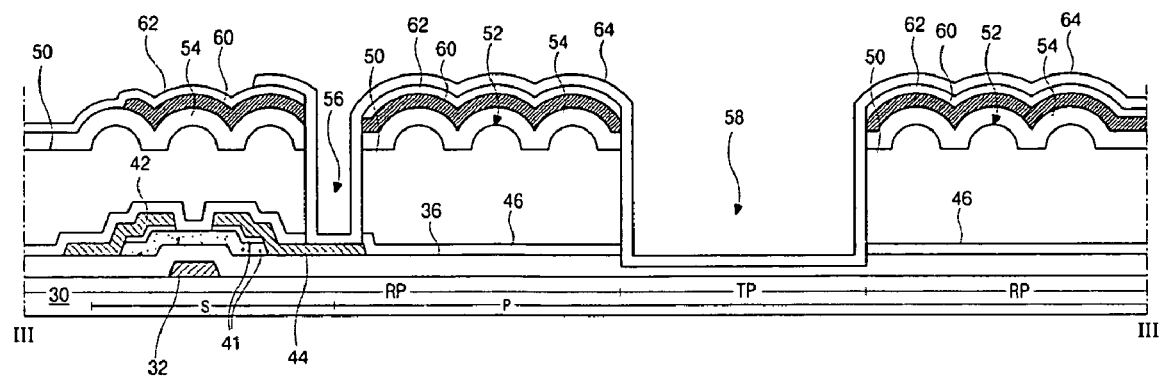

Therefore, the LCD device can be both driven a reflective mode and a transmissive mode by the uneven transflective film without a reflective pattern such as the reflective layer 60 (of FIG. 3F) inner side of the LCD device. Specifically, because of the hemispherical shape of the convex pattern 502, the transflective LCD device according to one embodiment of the present invention can obtain high reflection efficiency and a wide-angle property. Although not shown, the uneven transflective film 500 and the first polarizer PL1 may be unified as a single body.

Hereinafter, a specific structure of the uneven transflective film 500 will be explained as referring to FIG. 5.

Figure 5:
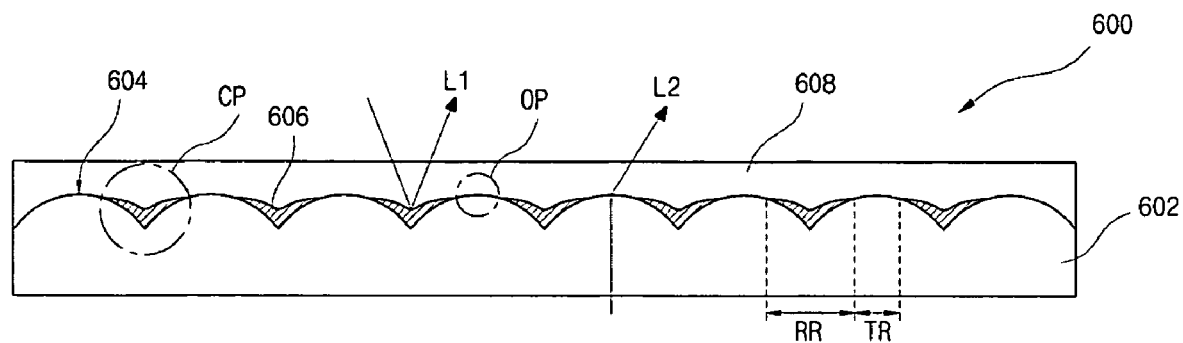
FIG. 5 is a schematic plan view of an uneven transflective film according to the present invention.

FIG. 5 is a schematic plan view of an uneven transflective film according to one embodiment of the present invention.

In FIG. 5, an uneven transflective film 600 includes a base film 602 including a plurality of convex patterns 604 and a plurality of concave portions CP between the plurality of convex patterns 604, and a reflective layer 606 in the plurality of concave portions CP. In addition, a passivation layer 608 on the convex patterns 604 and the reflective layer 606.

The base film 602 and the passivation layer 608 are selected from transparent materials. Specifically, the base film 602 is selected from a polymer based material such as polyester. The reflective layer 606 is selected from a metallic material having a high reflectance such as aluminum (Al) and silver (Ag).

Specifically, the convex pattern 604 has a hemispherical shape to improve reflection efficiency. Although not shown, the reflective layer 606 may be formed as a single layer having open portions OP that correspond to the convex patterns 604. In other words, a portion of the convex pattern 604 is exposed through the open portion OP of the reflective layer 606. Therefore, a portion of the reflective layer 606 between the convex patterns 604 is defined by a reflection region RR where incident light from in the top portion is reflected, a portion of the convex pattern 604 corresponding to the open portion OP is defined by a transmission region TR where incident light from outside in a back side of the convex pattern 604 is transmitted.

Accordingly, the reflection efficiency increases, interference is prevented, and the viewing angle is improved by using the uneven transflective film 600 having the convex patterns 604 and the reflective layer 606.

Hereinafter, a method of fabricating the uneven transflective film according to the present invention will be explained as referring to FIGS. 6A to 6E.

Figure 6A:
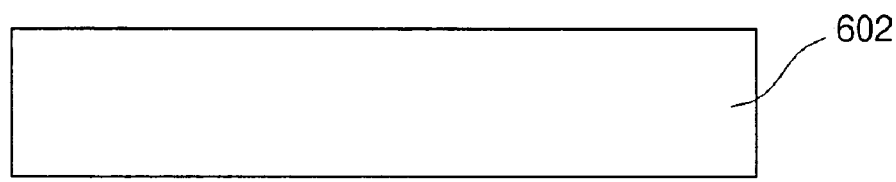
FIGS. 6A to 6E are schematic cross sectional views of a fabricating process for the uneven transflective film according to the present invention.

In FIG. 6A, a base film 602 that is selected from a polymer based material such as polyester is prepared.

Figure 6B:
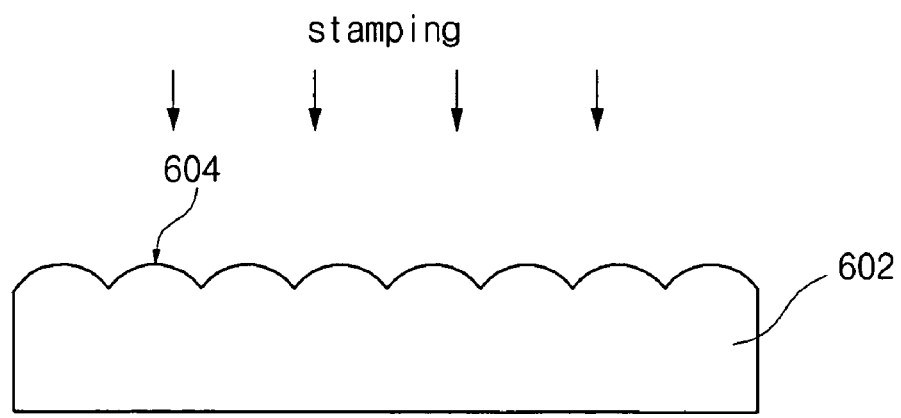

Next, in FIG. 6B, a plurality of convex patterns 604 are formed by stamping the top surface of the base film 602. Each convex pattern 604 has a hemispherical shape.

Figure 1:
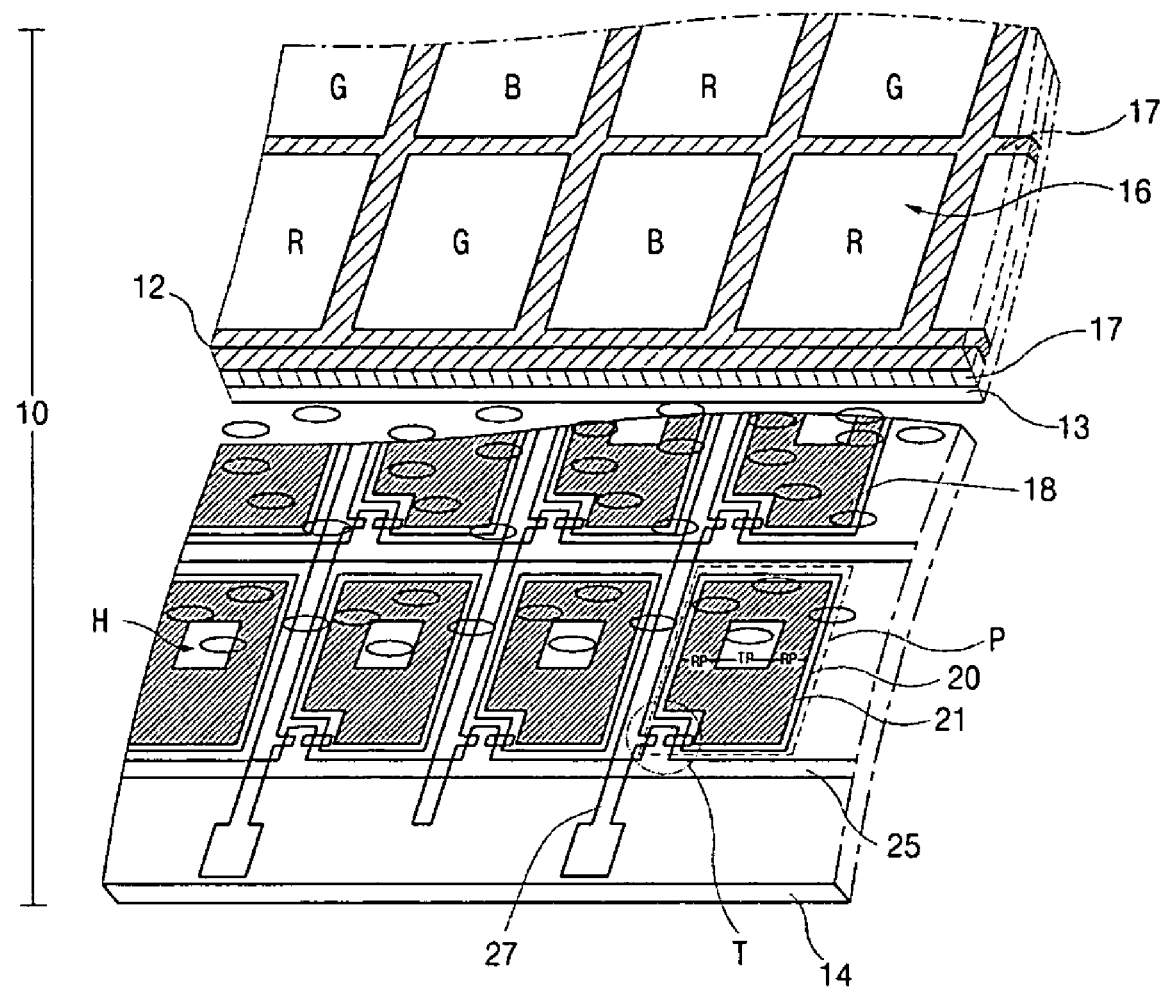
FIG. 1 is an exploded perspective view of an LCD device according to the related art.
Figure 2:
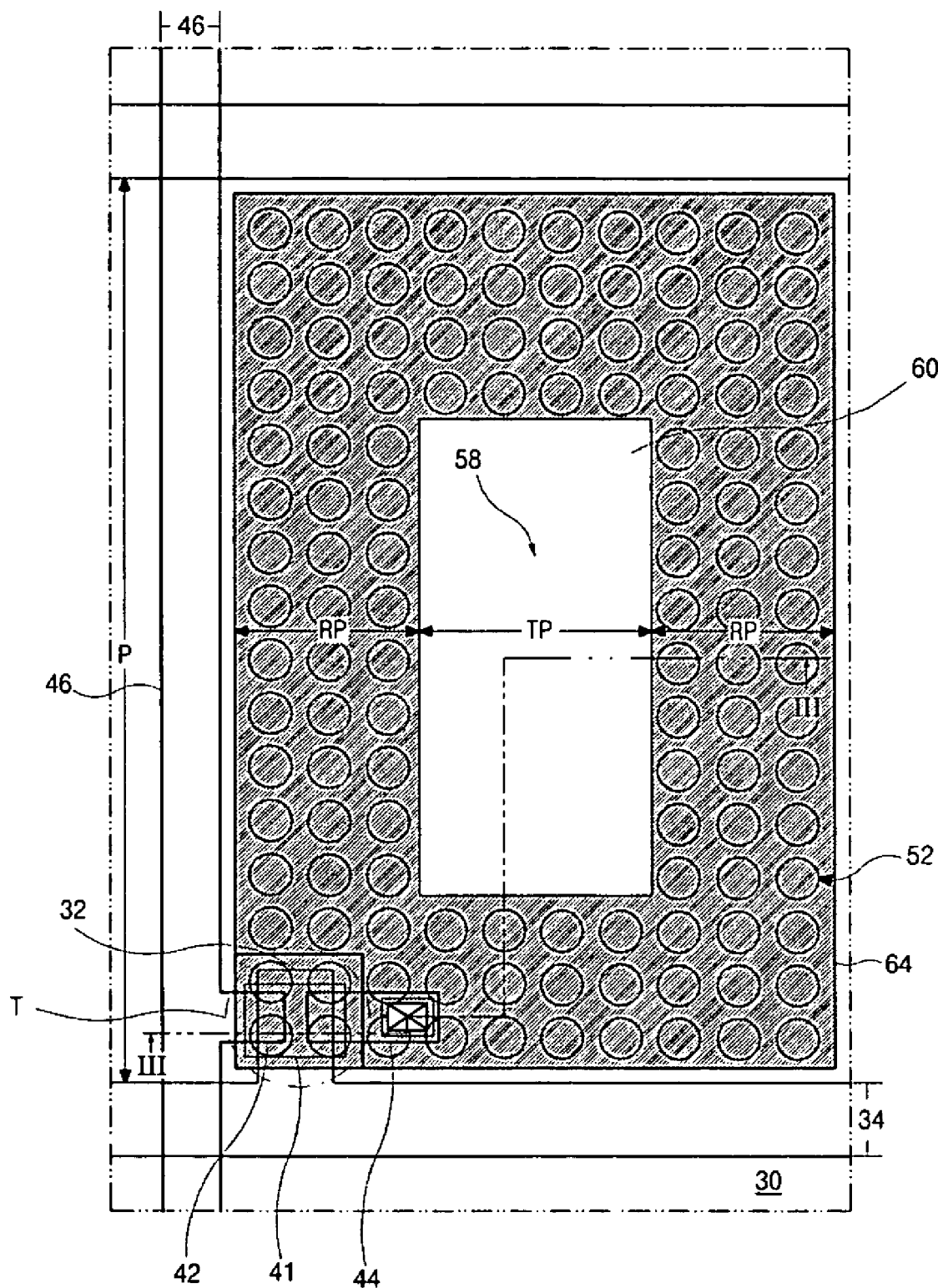
FIG. 2 is a schematic plan view showing one pixel region for a transflective LCD device having an uneven reflective layer according to the related art.

That is to say, the transflective LCD device having the uneven transflective film 600 is manufactured simpler process than the transflective LCD device of the related art by omitting photolithography and melting of the reflective layer 64 (of FIG. 2) having the uneven patterns 52 (of FIG. 2).

Figure 6C:
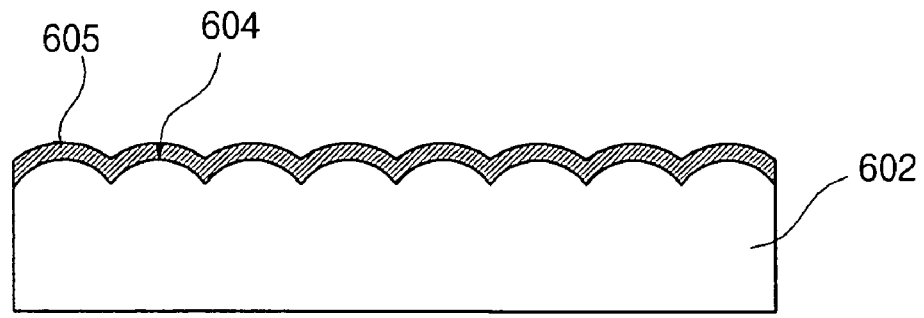

In FIG. 6C, a reflective material layer 605 is formed on an entire surface of the convex patterns 604. The reflective material layer 605 is selected from a metallic material having a high reflectance such as aluminum (Al) and silver (Ag).

Figure 6D:
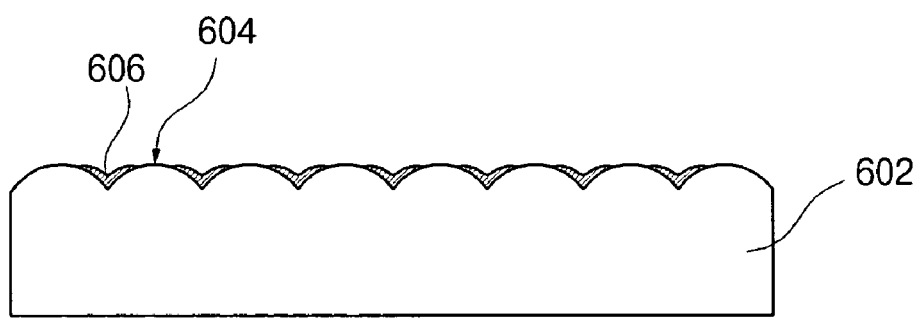

In FIG. 6D, the reflective material layer 605 (of FIG. 6C) corresponding to the convex patterns 604 is removed by etching to form a reflective layer 606 between the convex patterns 604. For example, etching of the reflective material layer 605 (of FIG. 6C) is performed using photolithography.

Figure 6E:
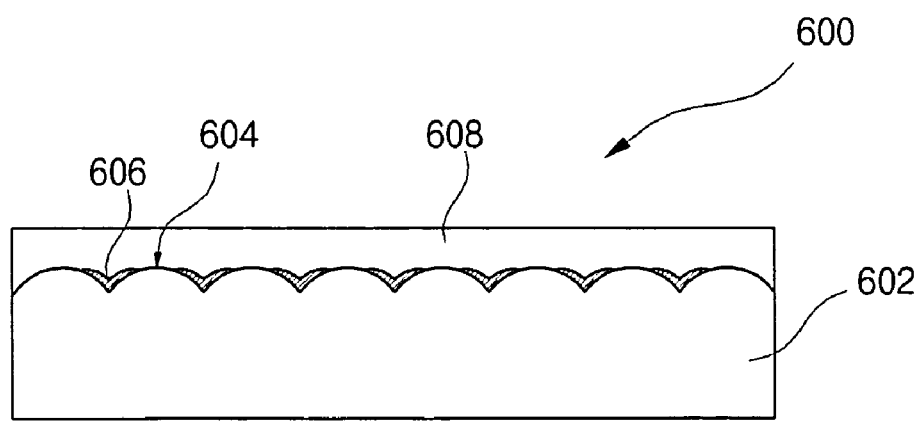

In FIG. 6E, a passivation layer 608 is formed on an entire surface of the convex patterns 604 and the reflective layer 606.

The base film 602 having the convex patterns 604, the reflective layer 606, and the passivation layer 608 constitute an uneven transflective film 600.

Hereinafter, a plan structure of the reflective layer of the uneven transflective film 600 according to the present invention will be explained as referring to FIG. 7.

Figure 7:
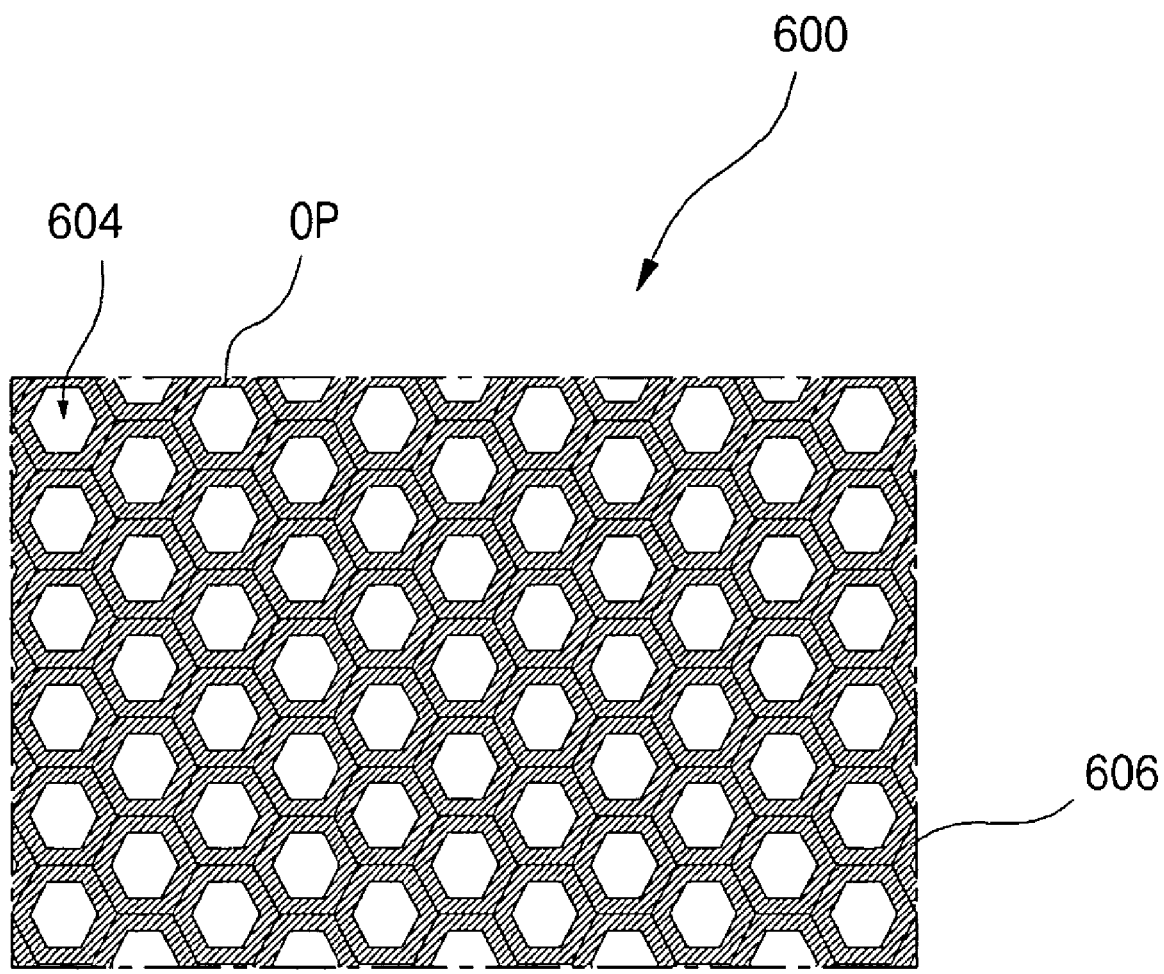
FIG. 7 is a schematic plan view of a reflective layer of an uneven transflective film according to the present invention.

As shown in FIG. 7, the reflective layer 606 is formed as a single body and has open portions OP corresponding to the convex patterns 604. For example, the open portions OP have hexagonal shapes. However, the open portions OP can have other shapes in combination with or instead of the hexagonal shapes.

As explained above, this uneven transflective film 600 can be easily applied to the LCD device and can effectively improve reflection efficiency.

Consequently, a transflective LCD device according to embodiments of the present invention has following advantages. First, the transflective LCD device can be both utilized in transmissive and reflective modes by including an uneven transflective film. Therefore, the transflective LCD device can be manufactured through a simpler process than that of the related art. Moreover, defect probability in the process, process time, and process cost can be reduced, thereby improving process yield and market competitiveness of production. Second, reflection and transmission efficiency can be increased. Third, because of the hemispherical shape of the uneven transflective film, the brightness of the display can be viewed in a wider angular range.

It will be apparent to those skilled in the art that various modifications and variations can be made in a transflective LCD device and a fabricating method thereof of the present invention without departing from the spirit or scope of the invention. Thus, it is intended that the present invention cover the modifications and variations of this invention provided they come within the scope of the appended claims and their equivalents.

What is claimed is:

1. A method of fabricating an uneven transflective film, the method comprising:
    stamping a surface of a base film to form a plurality of convex patterns and a plurality of concave patterns, the plurality of convex patterns having a hemispherical shape on a base film;
    forming a reflective material layer on an entire surface of the convex patterns and the plurality of concave patterns; and
    etching the reflective material layer corresponding to the convex patterns to form a reflective layer on an entire top surface of the base film excluding the plurality of convex patterns,
    wherein at least one of the plurality of convex patterns is disposed in a center of a pixel region, and
    wherein each concave pattern has a V shape, and a thickness of the reflective layer corresponding to a center of the each concave pattern is greater than a thickness of the reflective layer corresponding to edges of the each concave pattern.

2. The method according to claim 1, wherein etching the reflective material layer utilizes photolithography.

3. The method according to claim 1, wherein each of the convex patterns has a hemispherical shape.

4. The method according to claim 1, wherein the reflective layer is a single layer.

5. The method according to claim 1, wherein the reflective material layer is etched such that no reflective layer remains on the convex patterns that are corresponding to open portions of the uneven transflective film that are not covered by a reflective material.

6. The method according to claim 5, wherein the reflective material layer is etched such that the reflective layer only remains between the convex patterns that are corresponding to the open portions of the uneven transflective film that are not covered by the reflective material.

* * * * *